US012627875B2

(12) United States Patent
Ooi et al.

(10) Patent No.: US 12,627,875 B2
(45) Date of Patent: May 12, 2026

(54) VARIABLE FIELD OF VIEW CAMERA

(71) Applicant: Dell Products L.P., Round Rock, TX (US)

(72) Inventors: Ghee Beng Ooi, Singapore (SG); Hin Loong Justin Wong, Singapore (SG); Chih Hao Kao, Singapore (SG)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 18/783,511

(22) Filed: Jul. 25, 2024

(65) Prior Publication Data

US 2026/0032329 A1    Jan. 29, 2026

(51) Int. Cl.
 H04N 23/55    (2023.01)
 G03B 11/04    (2021.01)
 H04N 23/51    (2023.01)

(52) U.S. Cl.
 CPC ........... H04N 23/55 (2023.01); G03B 11/043 (2013.01); H04N 23/51 (2023.01)

(58) Field of Classification Search
 CPC ...... H04N 23/55; H04N 23/51; G03B 11/043; G06F 1/1686
 See application file for complete search history.

(56) References Cited

U.S. PATENT DOCUMENTS 7,050,106 B2 *    5/2006    Nagano .................. H04N 1/195
                                                              355/21
7,274,522 B2    9/2007    Inamoto

| 7,667,897 B2 | 2/2010 | Seo | |
|---|---|---|---|
| 7,773,144 B2 | 8/2010 | Tanaka | |
| 8,054,379 B2 * | 11/2011 | Yuan ................... | H04M 1/0264 |
| | | | 348/375 |
| 8,639,106 B1 * | 1/2014 | Gleason ................ | G03B 17/14 |
| | | | 396/529 |
| 9,143,630 B2 * | 9/2015 | Hayashi ............. | H04N 1/19594 |
| 9,176,364 B2 * | 11/2015 | Vance .................... | G03B 17/17 |
| 9,420,152 B2 * | 8/2016 | Eromäki ............... | H04N 23/55 |
| 11,016,273 B2 * | 5/2021 | Wippermann ......... | G03B 17/17 |
| 12,429,927 B2 * | 9/2025 | Mishra .................. | H04N 23/51 |
| 2002/0061767 A1 * | 5/2002 | Sladen .................. | H04N 23/58 |
| | | | 455/566 |
| 2003/0162564 A1 * | 8/2003 | Kimura ................. | H04N 7/142 |
| | | | 348/E5.025 |
| 2003/0181225 A1 * | 9/2003 | Hasegawa ............. | H04N 23/55 |
| | | | 348/E5.025 |

(Continued)

*Primary Examiner* — Timothy J Henn

(74) *Attorney, Agent, or Firm* — Zagorin Cave LLP; Robert W. Holland

(57)    ABSTRACT

A camera lens cover couples to a camera to rotate a cover plate from a position that blocks the lens to a position that exposes the lens. The cover plate has a mirror inner surface that reflects light. When the cover plate rotates less than 90 degrees, a reflection captures visual images of a desktop from the mirror to the camera field of view. Rotation of the lens cover moves the mirror reflection axis to capture different parts of the desktop. When the cover plate rotates greater than 90 degrees, the lens field of view captures an end user looking at the camera. When the cover plate rotates 180 degrees, the mirror reflection is of the area behind the end user to enhance security. The cover plate rotates 270 degrees to a stowage position for unhindered webcam usage.

15 Claims, 15 Drawing Sheets

(56)                         References Cited

U.S. PATENT DOCUMENTS

| | | | |
|---|---|---|---|
| 2009/0262209 A1* | 10/2009 | Pai | H04N 1/00031 |
| | | | 348/222.1 |
| 2011/0069181 A1* | 3/2011 | Lo | H04N 23/64 |
| | | | 348/E5.04 |
| 2012/0212413 A1* | 8/2012 | Plagemann | G06F 3/005 |
| | | | 345/158 |
| 2012/0268648 A1* | 10/2012 | Yang | G02B 7/102 |
| | | | 348/360 |
| 2013/0163980 A1* | 6/2013 | Lazaridis | G03B 17/565 |
| | | | 396/529 |
| 2014/0285913 A1* | 9/2014 | Palmeri | H04N 23/51 |
| | | | 359/876 |
| 2019/0306427 A1* | 10/2019 | Matsuka | G02B 27/0977 |
| 2019/0373091 A1* | 12/2019 | Robinson | H04N 23/51 |
| 2021/0364728 A1 | 11/2021 | Li et al. | |
| 2022/0210304 A1* | 6/2022 | Lalinde | H04N 1/00551 |
| 2023/0003998 A1 | 1/2023 | Li et al. | |
| 2023/0115144 A1* | 4/2023 | Kao | H04N 23/57 |
| | | | 348/369 |

* cited by examiner

VARIABLE FIELD OF VIEW CAMERA

BACKGROUND OF THE INVENTION

Field of the Invention

The present invention relates in general to the field of information handling system cameras, and more particularly to an information handling variable field of view camera.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include processing components in a housing that cooperate to process information. Stationary information handling systems, such as desktop and tower systems, integrate processing components in a stationary housing and interact with an end user through peripheral input/output (I/O) devices, such as a peripheral display, keyboard and mouse. Portable information handling systems typically include the processing components, a keyboard, a display and a power source in a portable housing to support mobile operations. Portable information handling systems allow end users to carry a system between meetings, during travel, and between home and office locations so that an end user has access to processing capabilities while mobile. Portable information handling systems will also typically interact with an end user through peripheral I/O devices, which tend to have a larger and more user-friendly footprint than integrated I/O devices. One example of such an I/O device is a camera integrated in a portable housing to support videoconferencing. Portable information handling systems typically integrate a camera in a display bezel so that the end user is captured as a visual image viewing roughly into the camera. However, integrated cameras that fit into a thin housing tend to capture visual images with a lower quality than peripheral cameras that have a larger space available for a quality lens.

Another advantage of a peripheral camera over an integrated camera is that the end user can place the camera at different locations to capture different visual images, such as a group of videoconference participants in a conference room or an object that is under discussion in the videoconference. In some instances, the object of interest might include notes or objects on the end user desktop. If an end user is participating in a videoconference with the portable information handling system integrated camera, the end user has to lift the system up to direct the camera in a desired direction. In contrast, a peripheral camera is more readily directed at the desktop or other locations to capture visual images of desired objects. However, even when using a peripheral camera, the end user has to release the camera from its bracket and point the camera field of view in a desired direction, which is often an awkward and two-handed task that disrupts the end user's train of thought. In some instances, peripheral camera field of view is directable by having a moveable bracket that holds the peripheral camera. One example is the Logitech Reach, which holds the camera at the end of an arm that rotates vertically and horizontally. This approach relies upon a stand placed on the desktop that is awkward to use and consumes valuable desktop space. Another example is the Logitech Brio 500, which mounts a camera on a top side of a peripheral display with a hinge to rotate the field of view down at the desktop. This approach uses a substantial hinge assembly that adds expense and still has a restricted movement for directing the field of view relative to the display position.

SUMMARY OF THE INVENTION

Therefore, a need has arisen for a system and method which directs a peripheral camera field of view to capture visual images around a desktop area.

In accordance with the present invention, a system and method are provided which substantially reduce the disadvantages and problems associated with previous methods and systems. A mirror coupled on the inner surface of a lens cover plate selectively reflects visual images to the camera field of view.

More specifically, an information handling system processes information with a processor and memory that cooperate to execute instructions, such as a videoconferencing application. A camera interfaced with the videoconferencing application captures visual images at a field of view through a lens. A lens cover plate coupled to a mount blocks the lens in a closed position and rotates about a hinge to a first open position that aligns a mirror reflection axis of a mirror on the inside of the cover plate with the field of view and a desktop so that the camera captures visual images of the desktop. The mount has a steel plate that magnetically couples to the camera at the lens by magnets included in the camera housing. The mount rotates around the lens to change the direction of the camera field of view. In one example embodiment, the cover plate rotates 90 degrees to enhance security by showing an end user a reflection of the area behind the end user when the end user is looking at the camera lens.

The present invention provides a number of important technical advantages. One example of an important technical advantage is that a camera supports a videoconference that shares documents by using a mirror coupled to an inner surface of a lens cover plate to direct the camera field of view to desired documents. The lens cover plate rotates about a hinge coupled to a mount to adjust the camera field of view forward and backwards. The mount rotates relative to the lens to adjust the camera field of view from side to side. The adjustment of the camera field of view is intuitive and does not involve any additional tools since the mirror remains attached to the cover plate when not in use.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system camera lens cover plate includes a mirror on an inside surface to reflect a view of a desktop into the camera that supports document communication in a videoconference. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
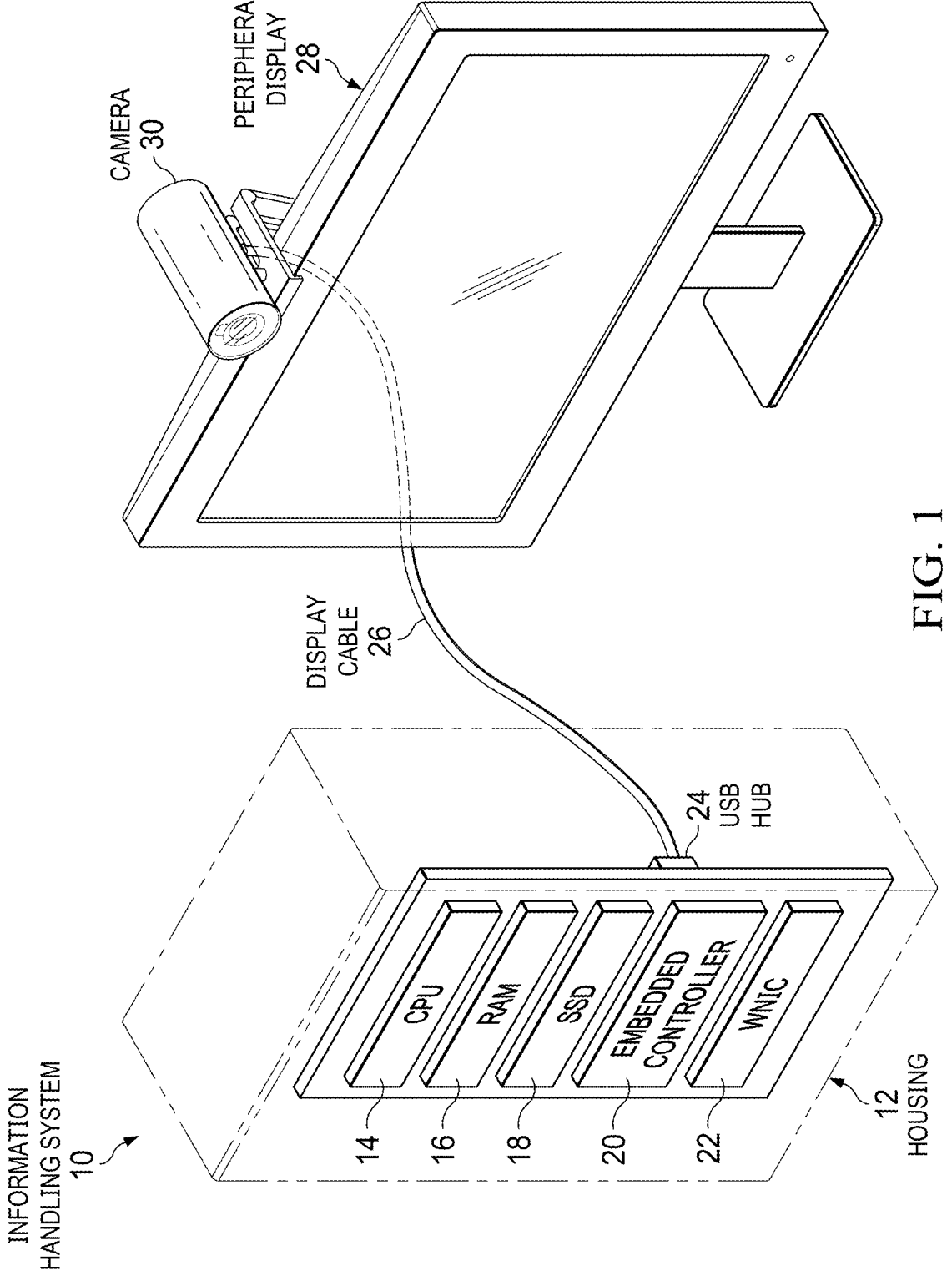
FIG. 1 depicts a block diagram of an information handling system that supports videoconferencing with a peripheral camera.

Referring now to FIG. 1, a block diagram depicts an information handling system 10 that supports videoconferencing with a peripheral camera 30. In the example embodiment, information handling system 10 has a desktop configuration with processing components coupled in a housing 12 having a fixed position. Alternative embodiments may use alternative types of information handling systems, such as convertible portable information handling systems. A central processing unit (CPU) 14 executes instructions that process information, such as an operating system and a videoconferencing application, in cooperation with a random access memory (RAM) 16 that stores the instructions and information. A solid state drive (SSD) 18 has persistent memory that stores the information and instructions when the system powers down and provides the instructions and information when the system boots to a power on state. An embedded controller 20 manages physical operating conditions at the information handling system, such as power and thermal conditions and interactions with I/O devices. A wireless network interface controller (WNIC) 22 supports wireless communication with external devices and networks, such as through WIFI and BLUETOOTH. A USB hub 24 provides communication with external devices through USB cables, such as a display cable 26 that interfaces with a peripheral display 28. A peripheral camera 30 couples to a top side of peripheral display 28 to capture visual images of the viewing area in front of peripheral display 28. For example, during a video conference, camera 30 captures visual images that are communicated through the Internet by WNIC 22 and presented at peripheral display 28 along with visual images of distal participants communicating to information handling system 10 through the Internet. During a videoconference, an end user may want to present physical documents captured by the camera. The end user will also want a secure environment.

Figure 2A:
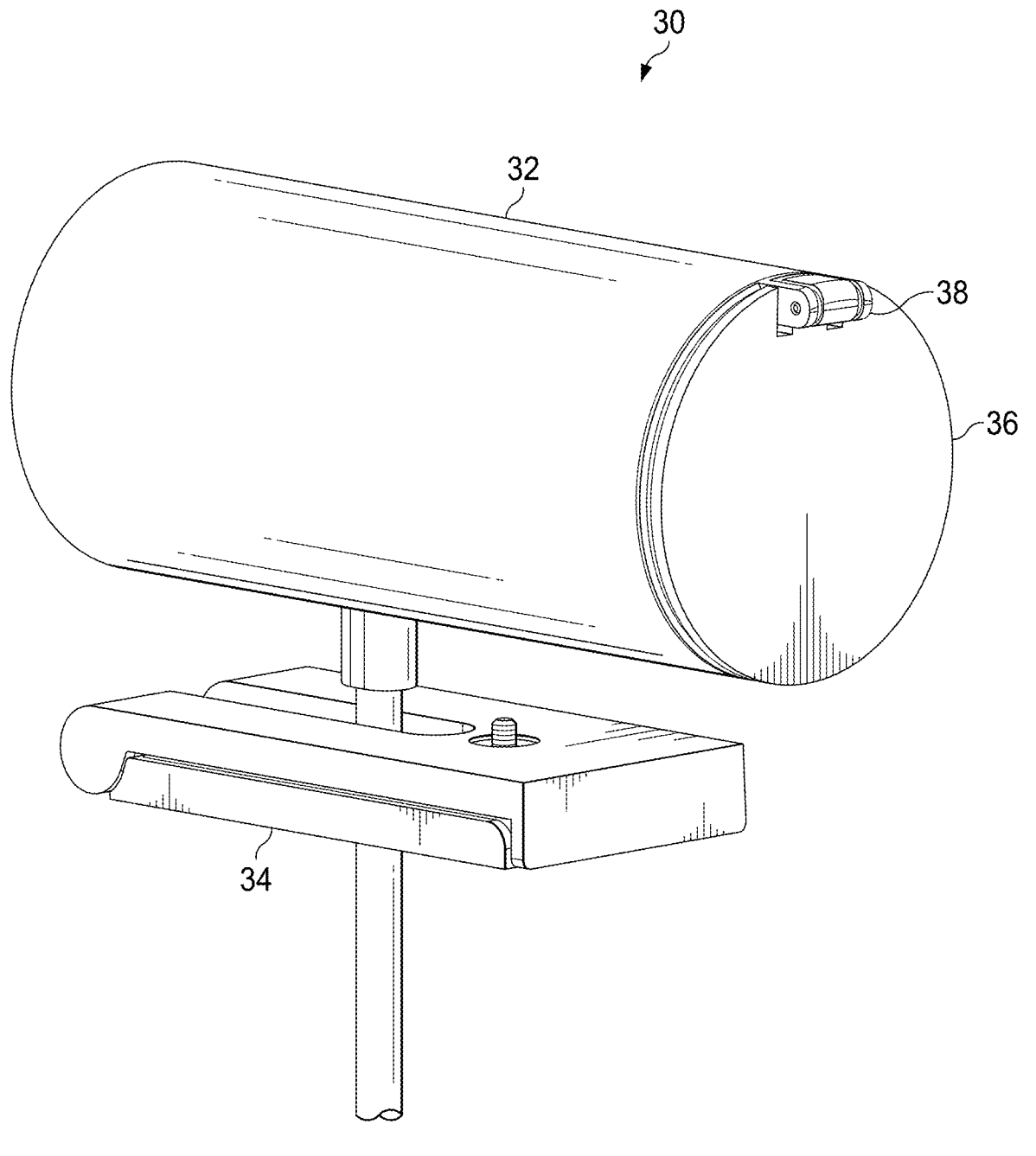
FIGS. 2A, 2B, 2C and 2D depict perspective views of a camera having an example lens cover that supports document sharing and a more secure videoconferencing area.
Figure 2B:
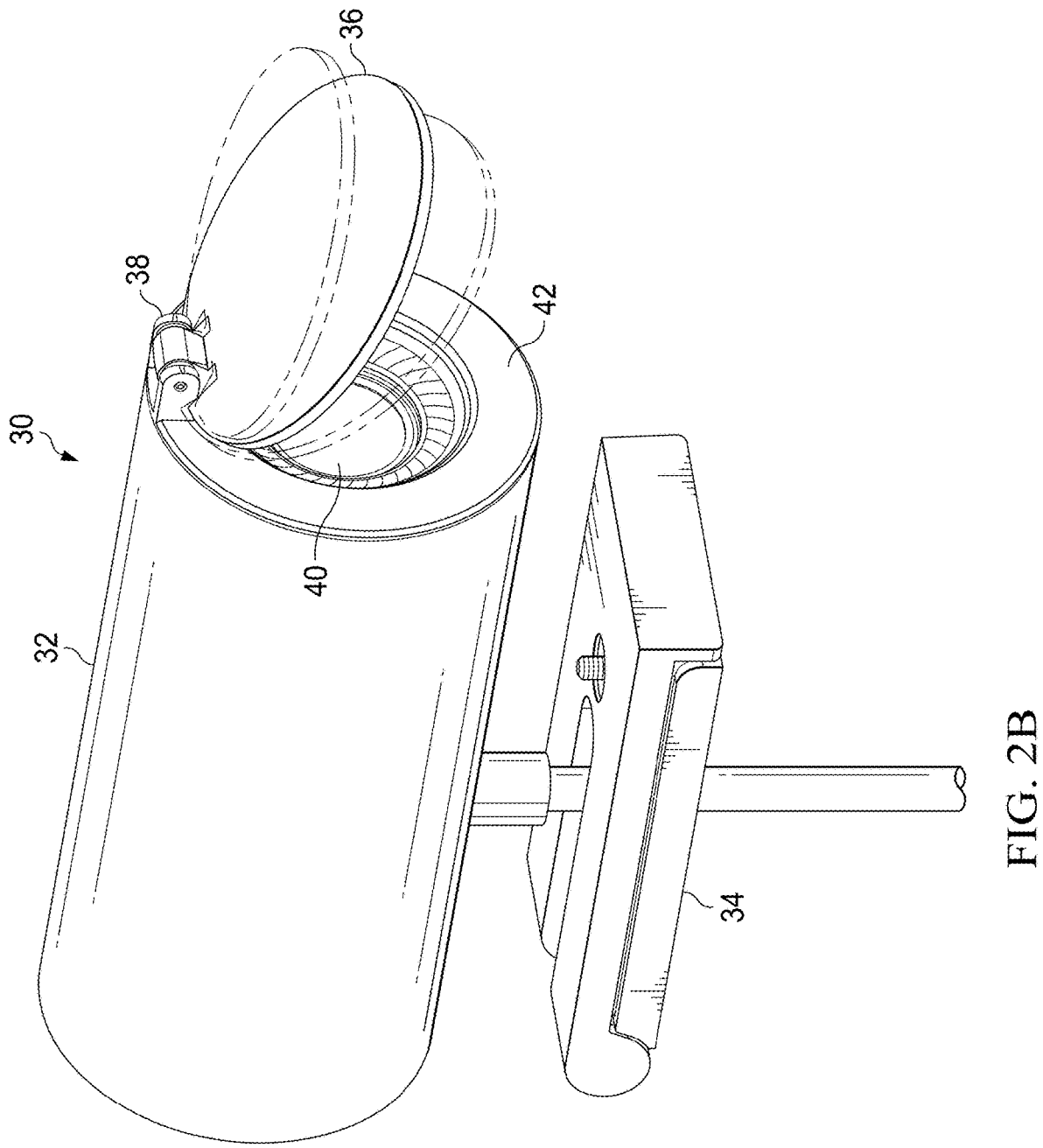
Figure 2C:
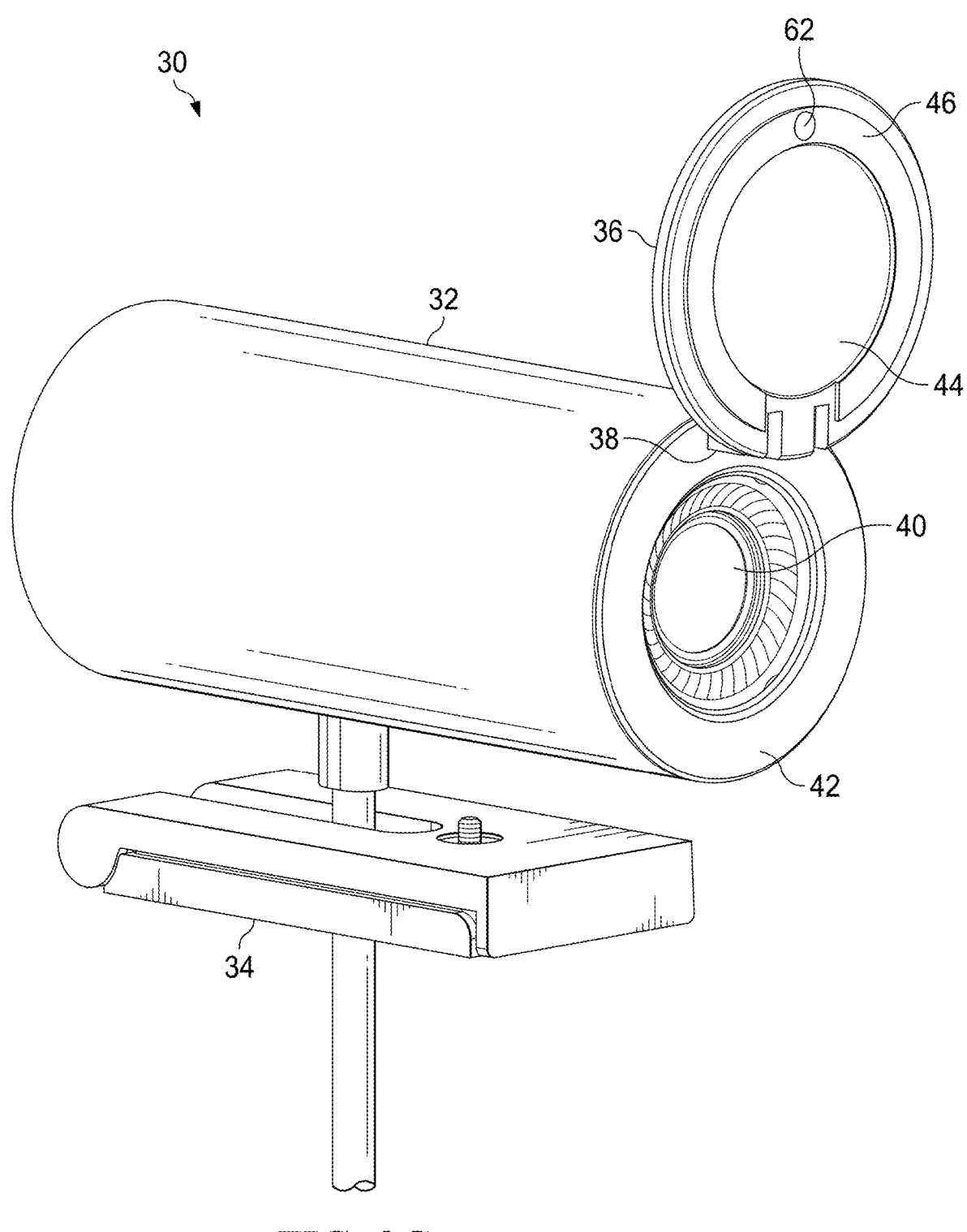
Figure 2D:
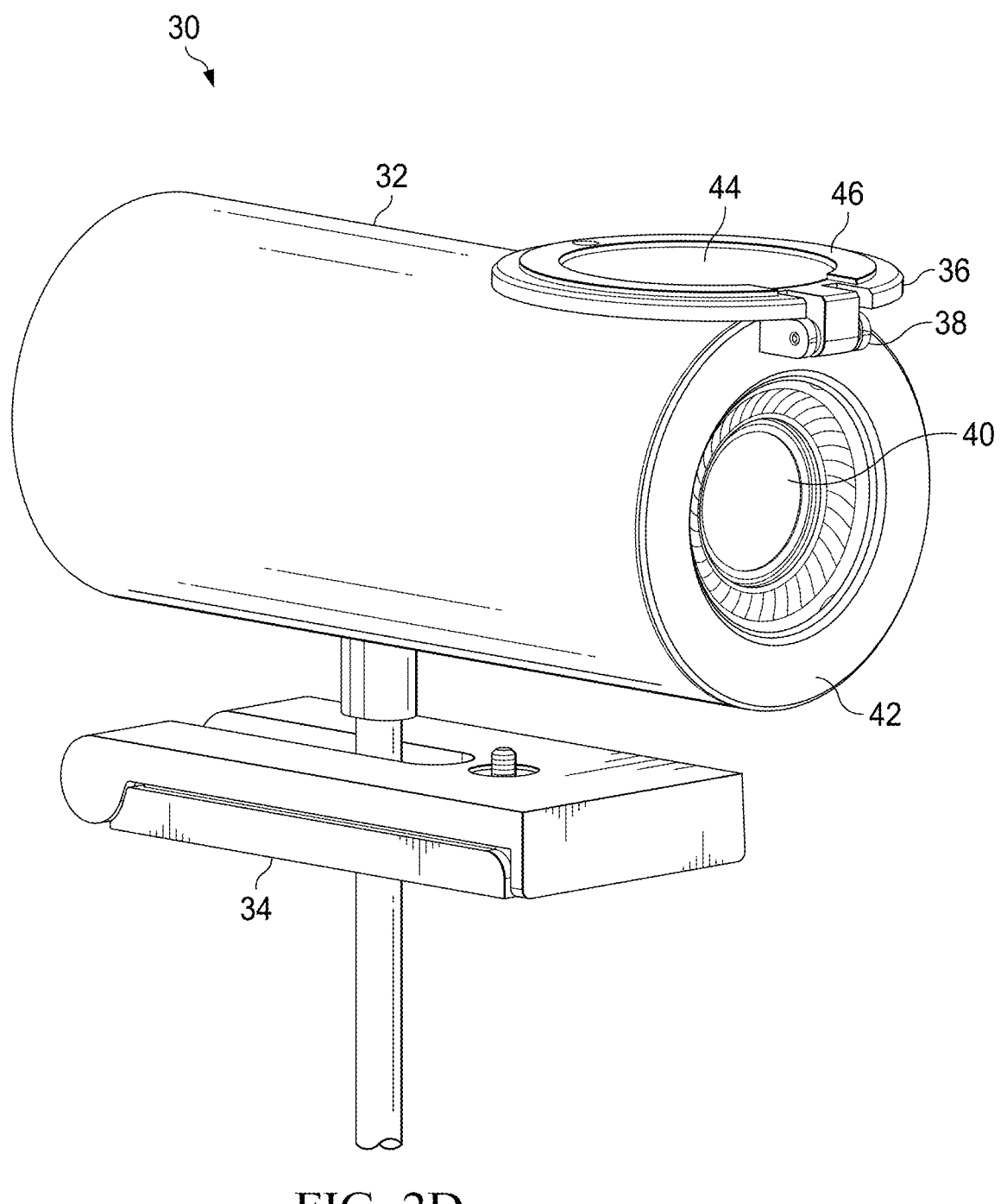

Referring now to FIGS. 2A, 2B, 2C and 2D, perspective views of a camera 30 depict an example lens cover that supports document sharing and a more secure videoconferencing area. FIG. 2A depicts camera 30 having a camera housing 32 mounted on a bracket 34 with a cover plate 36 rotated about a hinge 38 to a closed position that blocks camera 30 from capturing visual images. FIG. 2B depicts cover plate 36 rotated about a hinge 38 to a partially open position of less than 90 degrees to expose the camera lens 40 so that light enters the lens to be captured by an image sensor to capture a visual image. A lens cover mount 42 couples the lens cover to the front of camera 30. As is shown in greater detail below, in the partially open position of FIG. 2B, a mirror on the inside of cover plate 36 reflects light from a reflection axis and into the field of view of lens 40. The mirror in the partially open position supports capture of visual images of documents located on a desktop below camera 30. FIG. 2C depicts cover plate 36 rotated 180 degrees about hinge 38 to expose lens 40 to capture visual images along the lens field of view without including reflected light. Mirror 44 faces the end user who is looking into lens 40 so that the end user can have a secure area behind himself by seeing in the reflection any persons behind him. A time of flight sensor 62 or other sensor may also be used to detect individuals and provide an indication, such as a flashing light. FIG. 2D depicts cover plate 36 rotated fully open by 270 degrees about hinge 38 to allow capture of visual images without the end user seeing a reflection.

Figure 3:
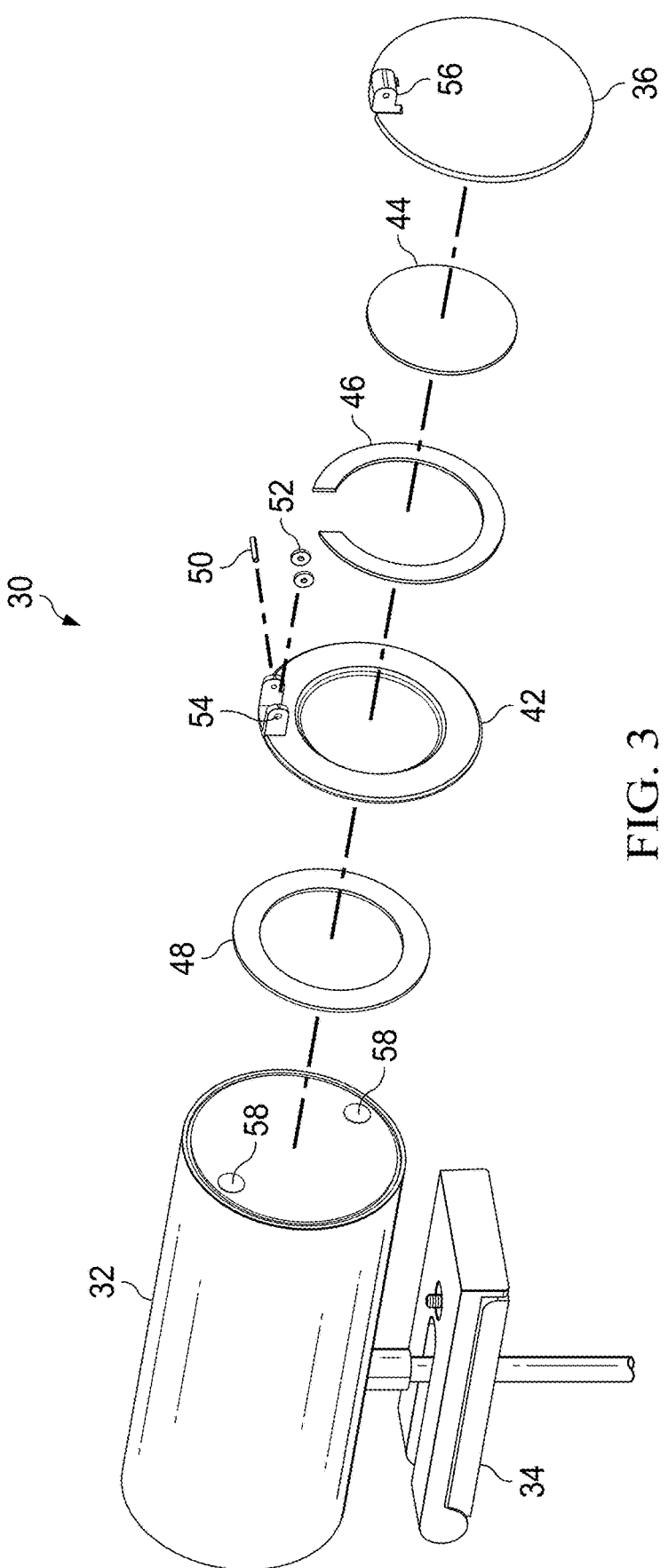
FIG. 3 depicts an exploded side perspective view of a lens cover that removably couples to a peripheral camera to selectively capture visual images of documents located on a desktop.

Referring now to FIG. 3, an exploded side perspective view depicts a lens cover that removably couples to a peripheral camera to selectively capture visual images of documents located on a desktop. In the example embodiment, camera 30 has housing 32 mounted on bracket 34 and includes first and second magnets 58 near an outer perimeter of the lens. A ferromagnetic material ring 48 is attracted to magnets 58 to couple the lens cover to the front face of camera housing 32. For example, a steel ring has a central opening through which the lens can capture visual images while the complete ring supports coupling of the lens cover at any rotational orientation. A mount 42 couples to the steel ring with an adhesive or other coupling arrangement so that the steel ring holds mount 42 firmly against the camera front face. Mount 42 has first and second members 54 with openings to accept a hinge pin 50 and rubber washers 52 to ensure a snug fit. Cover plate 36 has a hinge body 56 that fits between members 54 so that hinge pin 50 holds cover plate 36 in place with a rotational relationship relative to mount 42. Mirror 44 couples with adhesive or other coupling arrangements to the inside surface of cover plate 36 and a poron ring 46 that buffers the physical intersection of cover plate 36 and mount 42. The entire lens cover can separate from housing 32 by pulling frame 42 away from magnets 58 to overcome the magnetic attraction of ferromagnetic material ring 48. Mount 42 rotates around the lens so that the hinge orientation can be selected by an end user thereby selecting where the reflection axis is directed, as is shown in greater detail below.

Figure 4A:
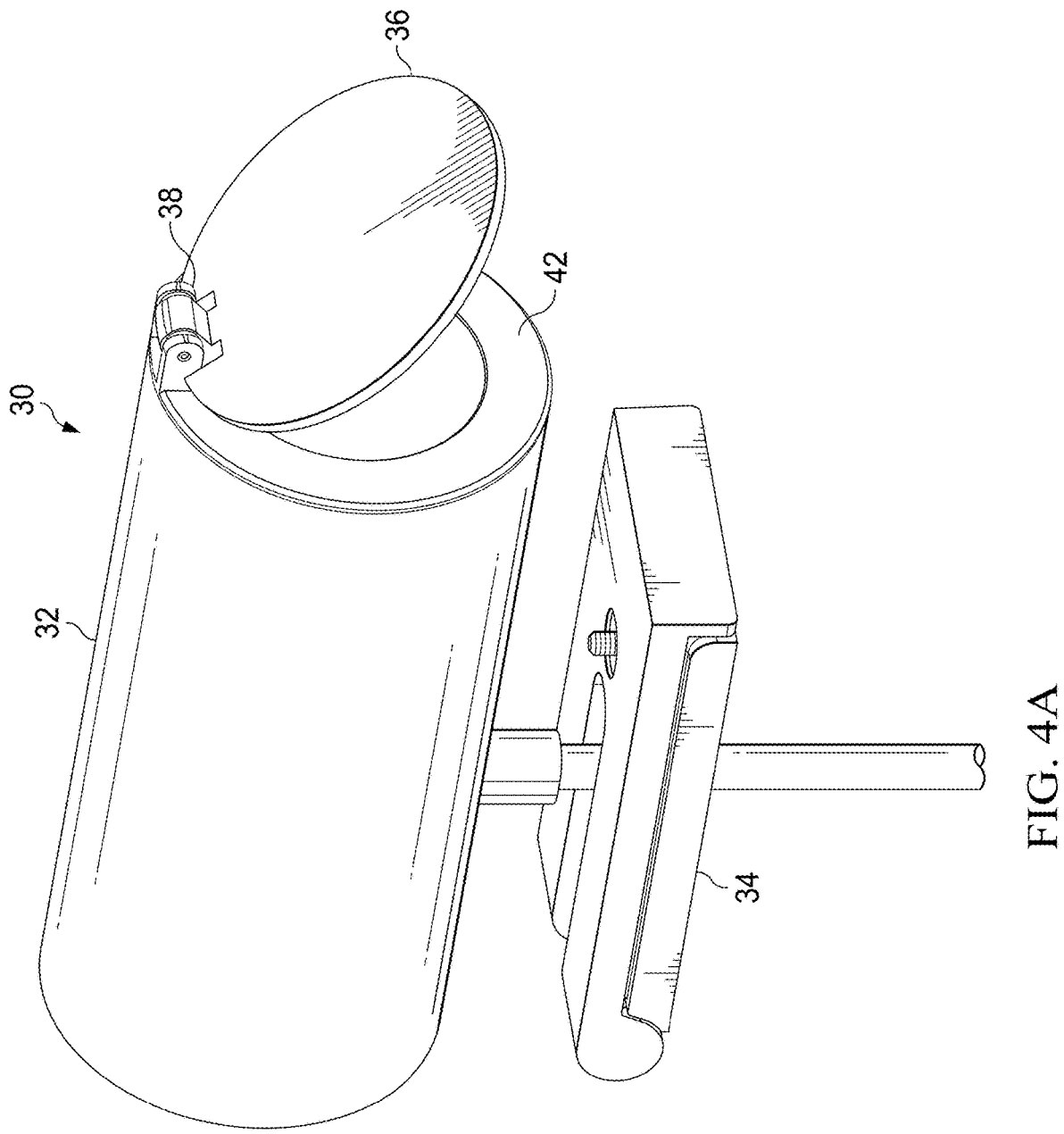
FIGS. 4A, 4B, 4C, 4D, 4E and 4F depict front perspective views of the camera in a variety of operating conditions.
Figure 4B:
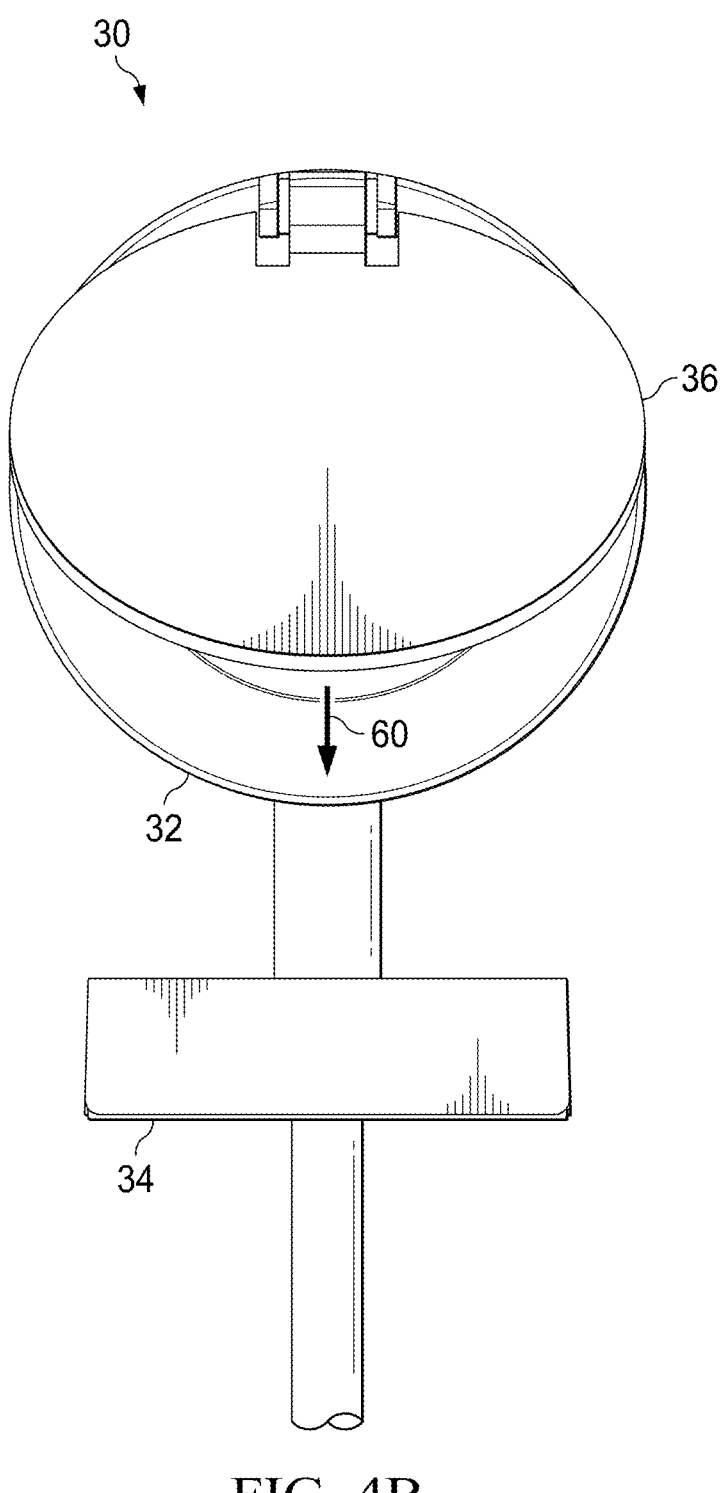
Figure 4C:
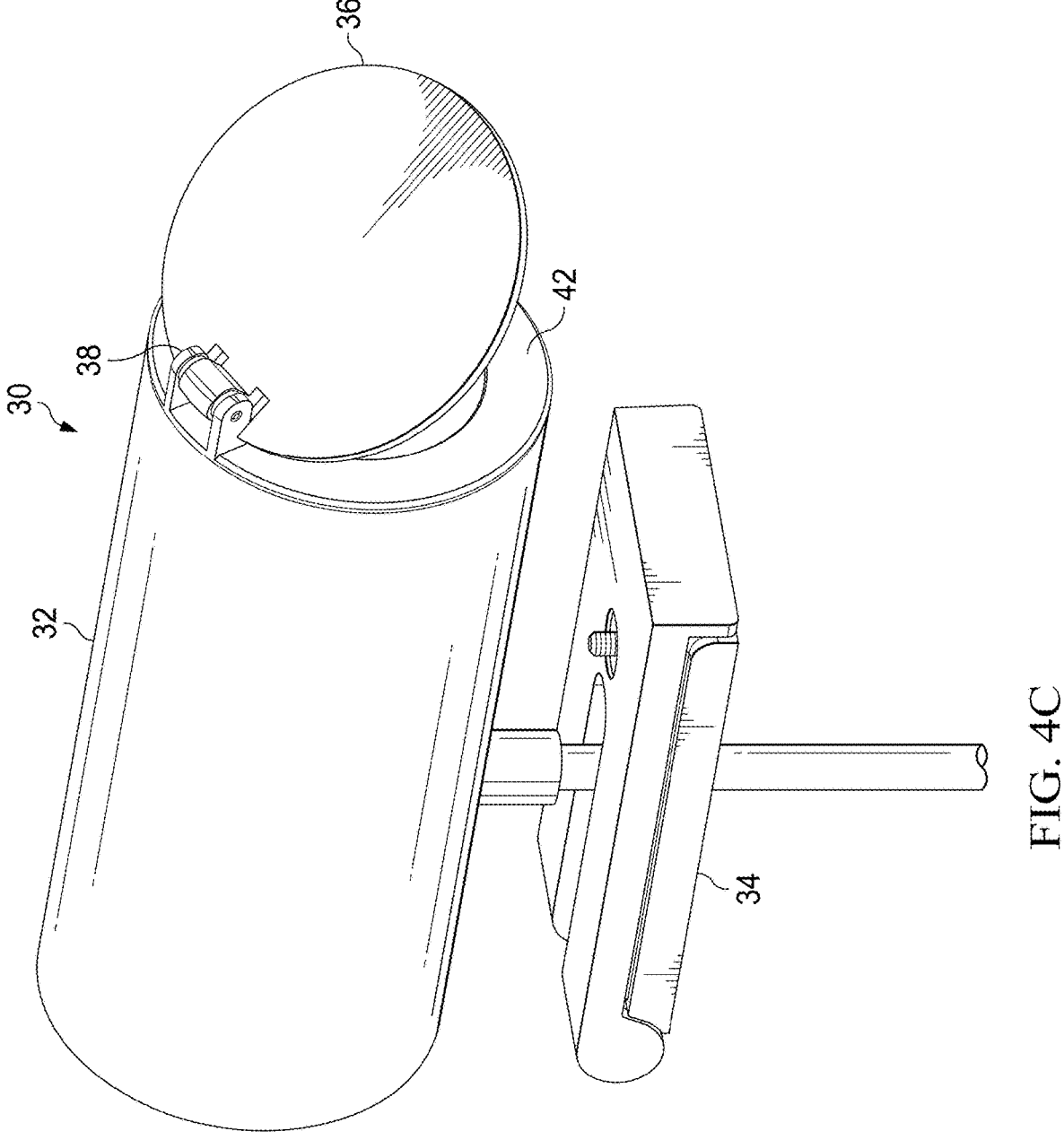
Figure 4D:
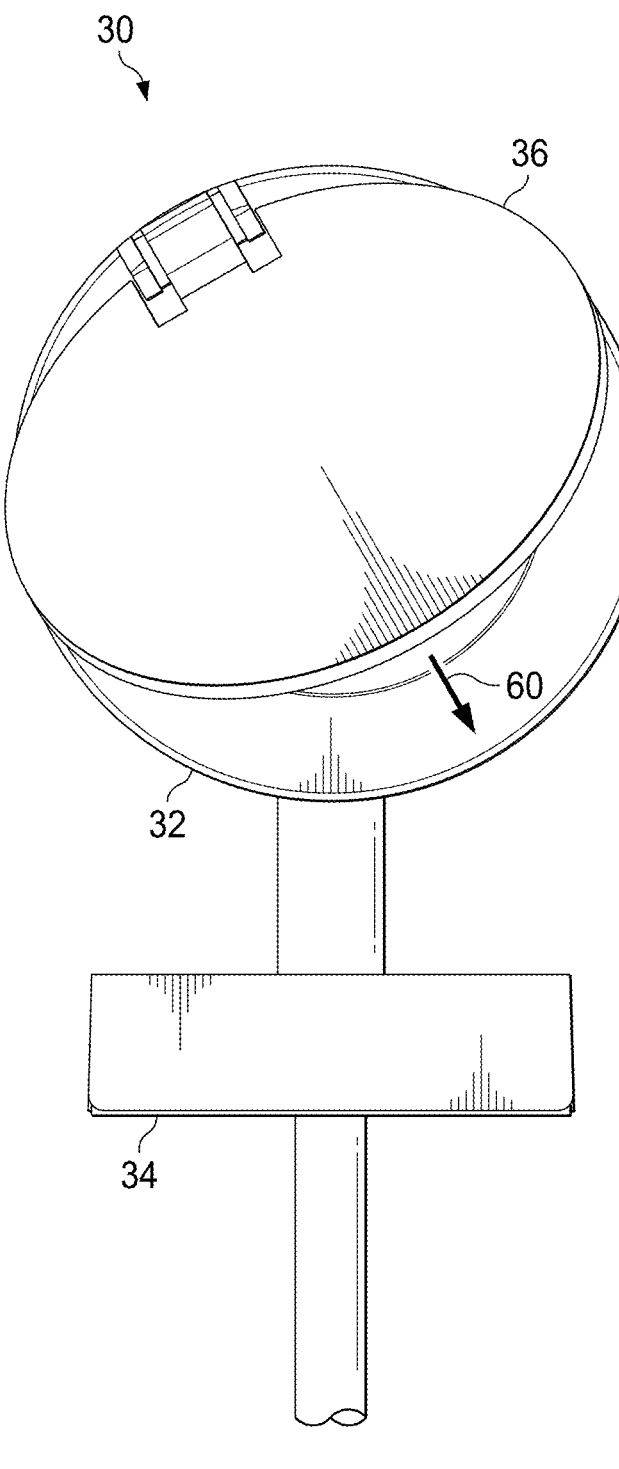
Figure 4E:
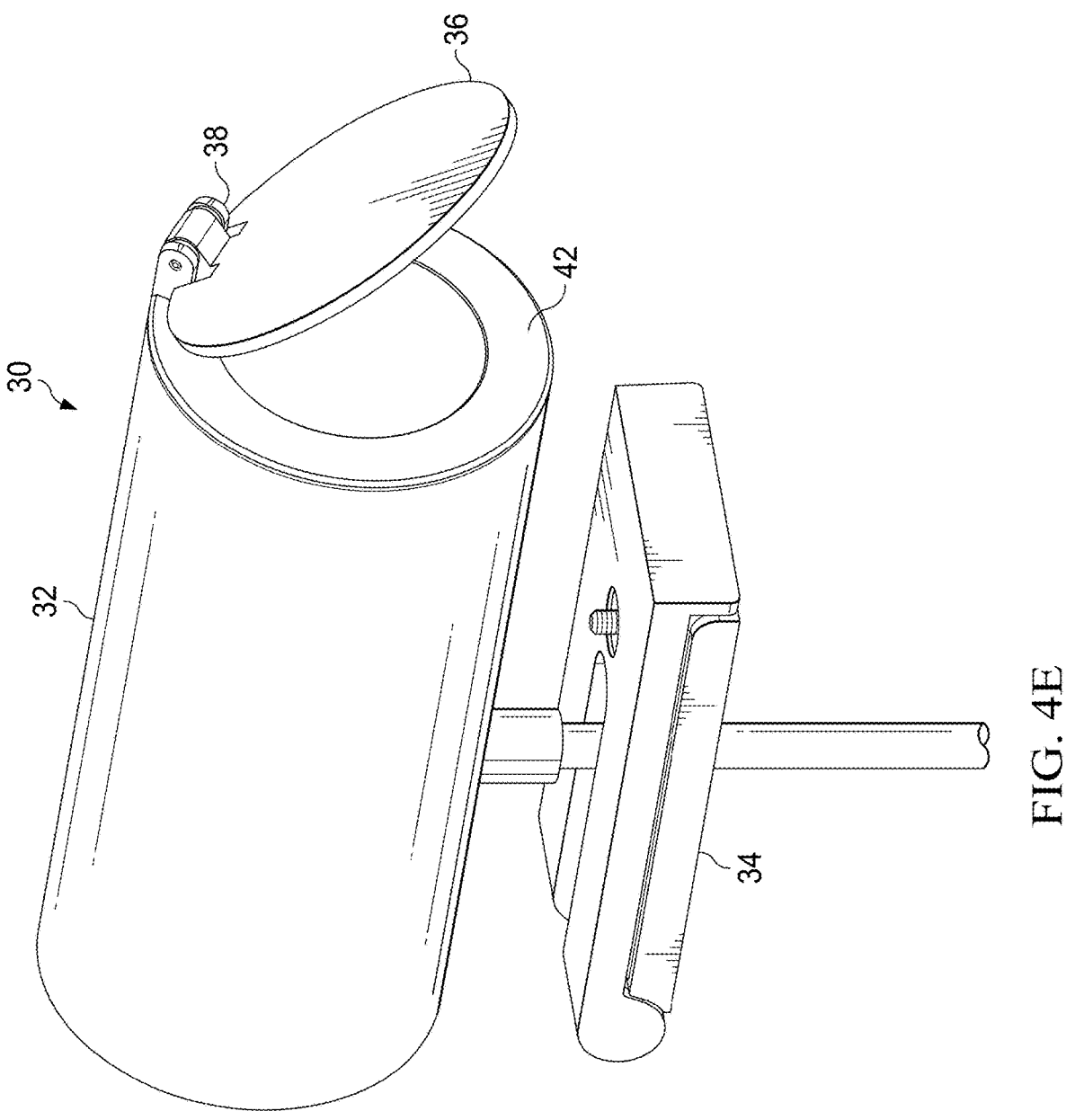
Figure 4F:
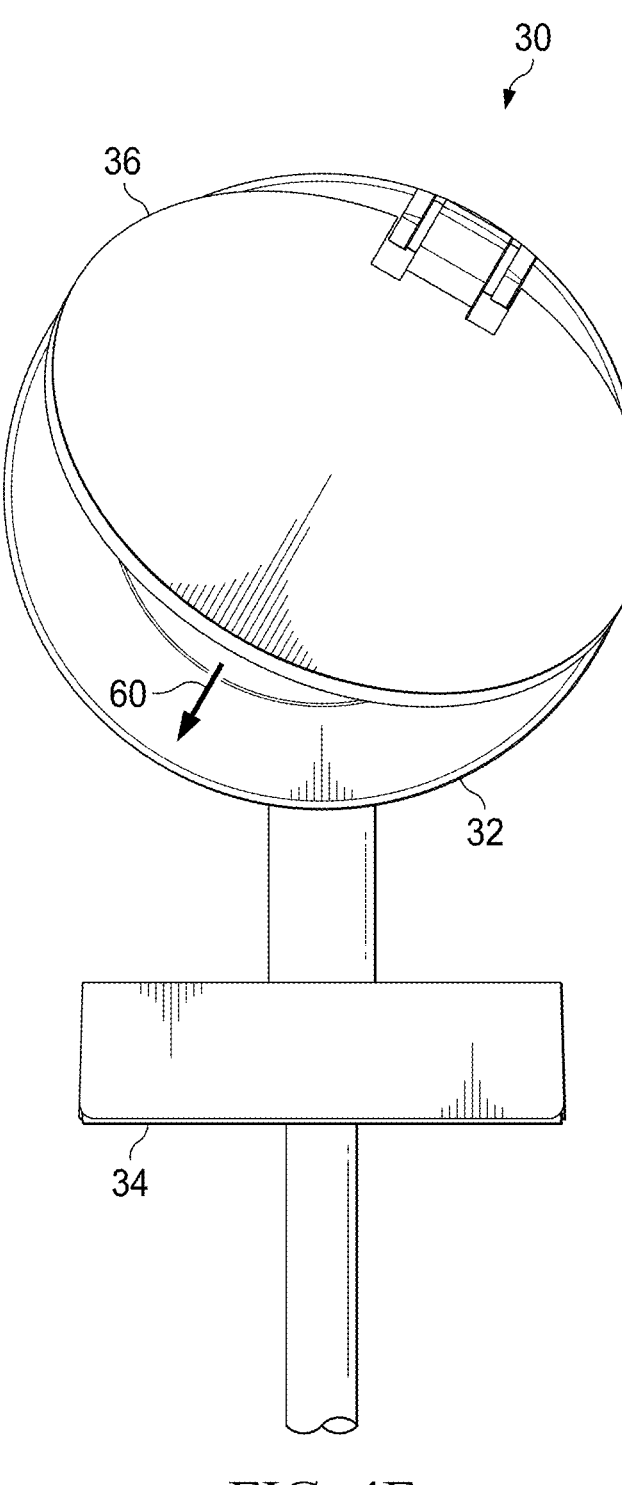

Referring now to FIGS. 4A, 4B, 4C, 4D, 4E and 4F, are front perspective views of the camera depicting a variety of operating conditions. FIGS. 4A and 4B depict camera 30 on bracket 34 with cover plate 36 rotated about hinge 38 so that a reflection axis 60 is directed towards a desktop surface directly below camera 30. A document located under reflection axis 60 has its reflection directed into lens 42 field of view to be captured as visual images by an image sensor of camera 30. In this example embodiment, mount 42 is rotated to have hinge 38 at an upper most position so the reflection axis is orthogonal the desktop. FIGS. 4C and 4D depict camera 30 with reflection axis 60 moved counterclockwise by rotation of mount 42 about the lens and camera field of view. FIGS. 4E and 4F depict camera 30 with reflection axis 60 rotated clockwise by rotation of mount 42 about the lens and camera field of view. Since the steel ring maintains constant magnetic attraction relative to the magnets included in the camera housing, the mirror reflection axis may rotate to direct the reflection axis as desired by an end user.

Figure 5A:
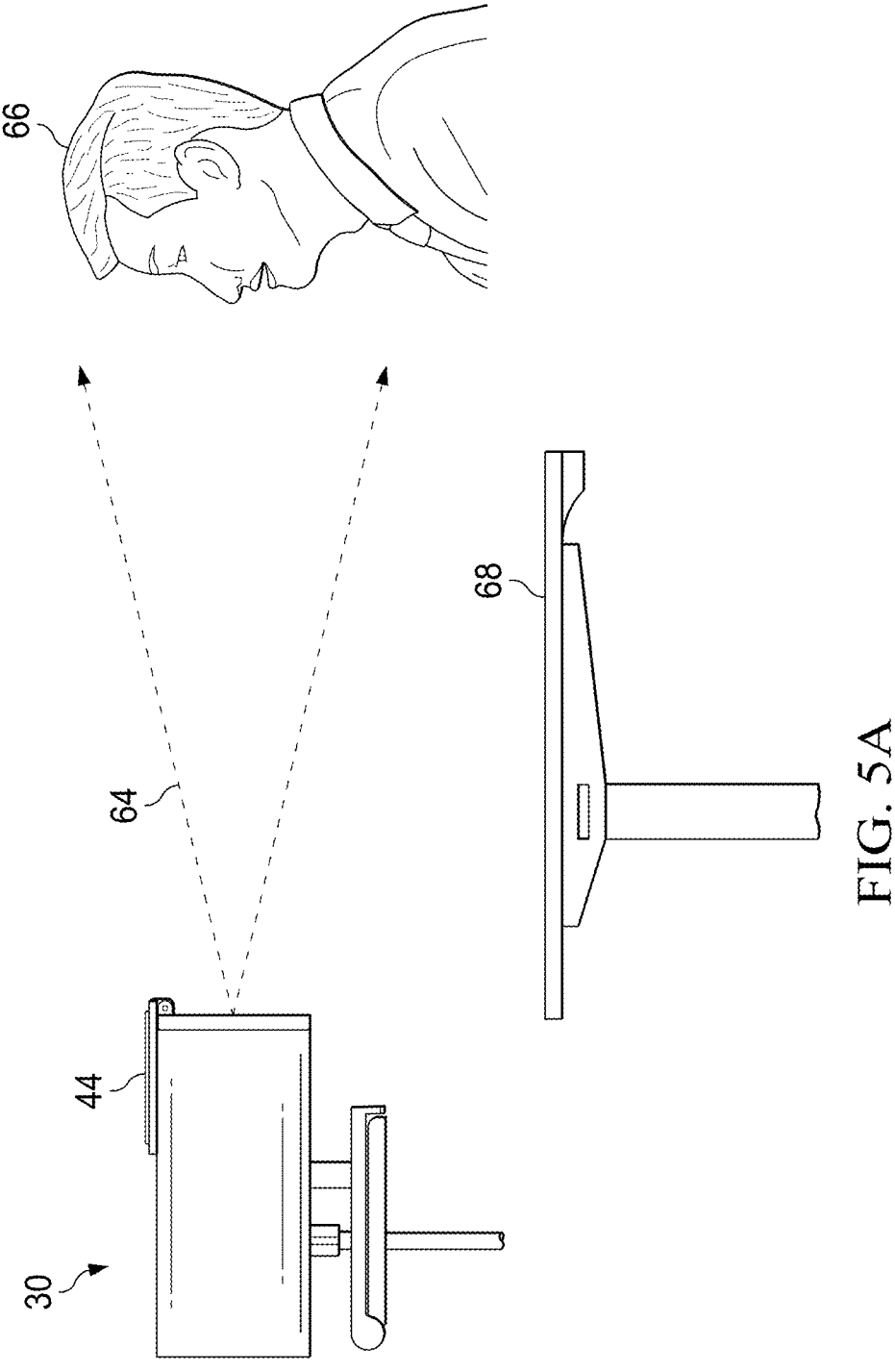
FIGS. 5A, 5B and 5C depict side views of the camera capturing desktop visual images.
Figure 5B:
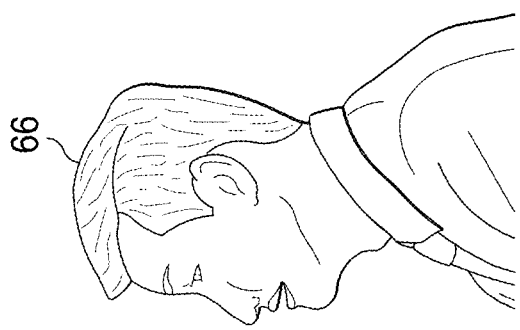
Figure 5B:
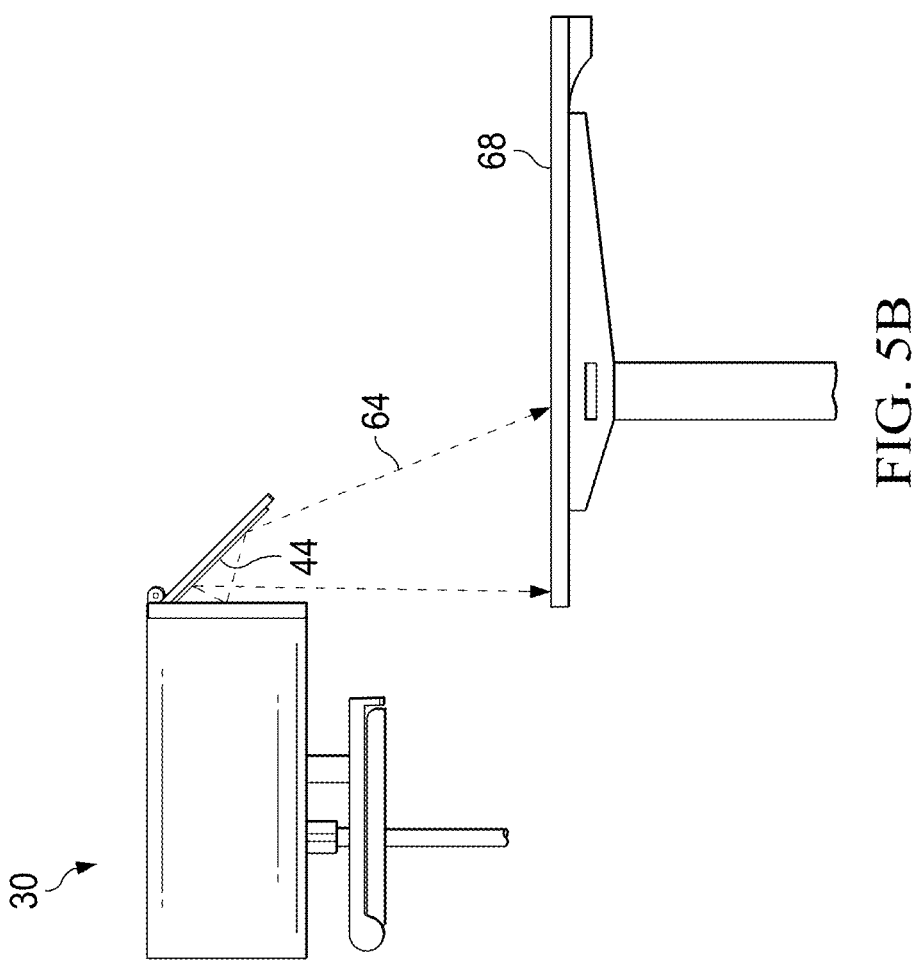
Figure 5C:
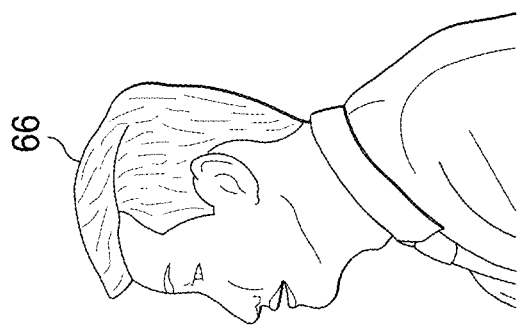
Figure 5C:
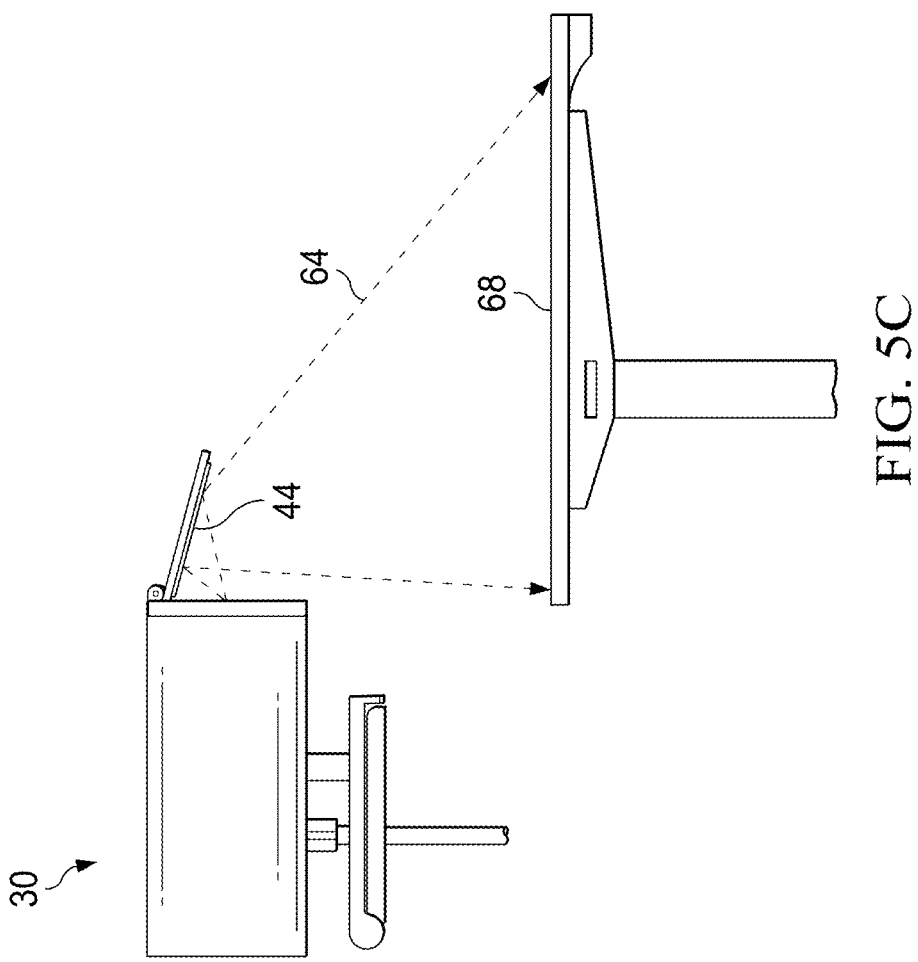

Referring now to FIGS. 5A, 5B and 5C, side views depict camera 30 capturing desktop visual images. In FIG. 5A, the lens cover plate is rotated 270 degrees relative to camera 30 to expose the camera field of view 64 for capture of visual images of the end user 66. FIG. 5B depicts camera 30 with the cover plate rotated to a 35 degree tilt angle so that mirror 44 reflects light to align field of view 64 with a front side of desktop 68 to capture visual images of a document or object on the desktop. FIG. 5C depicts camera 30 with the lens cover plate rotated to 55 degrees so that the camera field of view 64 captures a greater area of desktop 68. By rotating the cover plate about the hinge and rotating the mount about the lens, an end user can direct the camera filed view to any desired area.

Although the present invention has been described in detail, it should be understood that various changes, substitutions and alterations can be made hereto without departing from the spirit and scope of the invention as defined by the appended claims.

What is claimed is:

1. An information handling system comprising:
  a housing;
  a processor coupled in the housing and operable to execute instructions that process information;
  a memory coupled in the housing and operable to store the instructions and information;
  a camera interfaced with the processor and operable to capture visual images along a field of view, the camera having a camera housing, a lens and an image sensor aligned with the lens to capture visual images from light passed through the lens along the field of view;
  a lens cover removeably coupled to the camera at the lens, the lens cover having a mount with an opening aligned to the lens field of view, a cover plate that blocks the opening, a hinge rotationally coupling the cover plate to the mount to rotate the cover plate between a blocking position that blocks the field of view and an open position that exposes the field of view, and a mirror coupled to the cover plate inside surface, the mirror directing a reflection to the field of view in the open position; and
  a sensor coupled to the cover plate near the mirror and operable to detect a person when located along a reflection axis of the mirror.

2. The information handling system of claim 1 wherein the mount rotates about the opening to change an angular position of the hinge and thereby a reflection axis of the mirror.

3. The information handling system of claim 1 further comprising:
  one or more magnets coupled in the mount; and
  a ferromagnetic material coupled to the camera housing, the one or more magnets removeably coupling the mount to the camera housing.

4. The information handling system of claim 1 further comprising:
  one or more magnets coupled to the camera housing; and
  a ferromagnetic material coupled to the mount, the one or more magnets removeably coupling the mount to the camera housing.

5. The information handling system of claim 4 wherein the ferromagnetic material comprises a ring having an opening, the mount rotating by sliding around the opening while the magnet holds the mount against the camera housing.

6. The information handling system of claim 4 wherein the hinge rotates the cover plate to a first open position of less than 90 degrees that reflects light from a reflection axis to the camera lens field of view and to a second open position of greater than 90 degrees that reflects the light at an end user in the camera lens field of view.

7. The information handling system of claim 6 wherein the hinge rotates the cover plate to a third open position of greater than 180 degrees that reflects light away from the camera lens field of view and the end user in the camera lens field of view.

8. The information handling system of claim 4 further comprising:
  first and second members extending from the frame, each of the first and second members having an opening; and
  a pin inserted through the hinge and coupled in the first and second member openings.

9. A method for capturing visual images with a camera, the method comprising:
  removably coupling a lens cover to a camera housing to block a lens of the camera with a cover plate over a lens of the camera;
  rotating the cover plate from a blocking position that blocks the lens to a first open position in which light enters the lens along a field of view;
  reflecting light from a mirror on an inner side of the cover plate into the lens along the field of view;
  rotating the cover plate to a second open position;
  receiving light along the field of view without reflecting from the mirror;
  rotating the lens cover about the field of view with the cover plate in the first open position;
  capturing visual images from light reflected by the mirror to the field of view as a reflection axis of the mirror rotates about the field of view;
  rotating the cover plate greater than 90 degrees to a third open position;
  reflecting light from the mirror at an end user being captured as a visual image by the camera, the mirror reflecting an area behind the end user;
  coupling a presence detection sensor to the cover plate proximate the mirror; and
  detecting a person behind the end user when the cover plate is in the third open position.

10. The method of claim 9 further comprising:
  coupling magnets to the camera proximate the lens; and removably coupling the lens cover to the magnets with ferromagnetic material coupled in the lens cover.

11. The method of claim 10 wherein the ferromagnetic material comprises a steel ring having an open central region, the steel ring aligned with magnets when rotating 360 degrees around the lens.

12. The method of claim 11 further comprising:

extending first and second members from a frame coupled to the steel ring; and inserting a pin through the first and second members and the cover plate to couple the cover plate to a mount that holds the steel ring.

13. A camera comprising:

a housing;

a lens coupled to the housing and having a field of view;

an image sensor aligned with the lens to capture visual images from light passed through the lens along the field of view; and a lens cover removeably coupled to the camera at the lens, the lens cover having a mount with an opening aligned to the lens field of view, a cover plate that blocks the opening, a hinge rotationally coupling the cover plate to the mount to rotate the cover plate between a blocking position that blocks the field of view and an open position that exposes the field of view, and a mirror coupled to the cover plate inside surface, the mirror directing a reflection to the field of view in the open position;

wherein:

the hinge rotates the cover plate to a first open position of less than 90 degrees that reflects light from a reflection axis to the camera lens field of view;

the hinge rotates the cover plate to a second open position of greater than 90 degrees that reflects the light at an end user in the camera lens field of view; and the hinge rotates to a third open position of greater than 180 degrees that reflects light away from the camera lens field of view and the end user in the camera lens field of view.

14. The camera of claim 13 further comprising:

one or more magnets coupled to the camera housing; and a ferromagnetic material coupled to the mount, the one or more magnets removeably coupling the mount to the camera housing.

15. The camera of claim 13 wherein the mount rotates about the opening to change an angular position of the hinge and thereby a reflection axis of the mirror.

\* \* \* \* \*